(12) United States Patent
Kikuchi

(10) Patent No.: US 9,118,954 B2
(45) Date of Patent: Aug. 25, 2015

(54) MODULE COPING WITH CONDITIONAL ACCESS BROADCASTING, DIGITAL BROADCASTING RECEIVING SYSTEM, AND METHOD OF CONTROLLING MODULE COPING WITH CONDITIONAL ACCESS BROADCASTING

(71) Applicant: Panasonic Corporation, Osaka (JP)

(72) Inventor: Akira Kikuchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/040,807

(22) Filed: Sep. 30, 2013

(65) Prior Publication Data

US 2014/0289758 A1    Sep. 25, 2014

(30) Foreign Application Priority Data

Mar. 22, 2013  (JP) .................................. 2013-059530

(51) Int. Cl.
*H04N 7/167* (2011.01)
*H04N 21/418* (2011.01)
*H04N 21/81* (2011.01)
*H04N 21/435* (2011.01)

(52) U.S. Cl.
CPC ....... *H04N 21/4181* (2013.01); *H04N 21/4183* (2013.01); *H04N 21/435* (2013.01); *H04N 21/814* (2013.01)

(58) Field of Classification Search
CPC .......... H04N 21/4183; H04N 21/4181; H04N 21/418
USPC ....................................................... 725/31, 33
See application file for complete search history.

(56) References Cited

U.S. PATENT DOCUMENTS 7,296,282 B1 *  11/2007  Koplar et al. ................... 725/23
2006/0020964 A1 *   1/2006  Yun ................................. 725/33

FOREIGN PATENT DOCUMENTS

JP       10-336048       12/1998
JP       2005-079753      3/2005

* cited by examiner

*Primary Examiner* — Olugbenga Idowu
(74) *Attorney, Agent, or Firm* — Wenderoth, Lind & Ponack, L.L.P.

(57) ABSTRACT

A module configured to cope with conditional access broadcasting includes an interface that is detachable from a receiver, the receiver being configured to receive digital broadcasting including conditional access broadcasting, and the interface being configured to acquire a transport stream produced based on the digital broadcasting, a descrambler configured to descramble data included in the transport stream, a loudspeaker configured to output sound, and a controller configured to detect emergency warning information included in the transport stream and control the loudspeaker to output sound related to the emergency warning information in response to the detection of the emergency warning information.

11 Claims, 7 Drawing Sheets

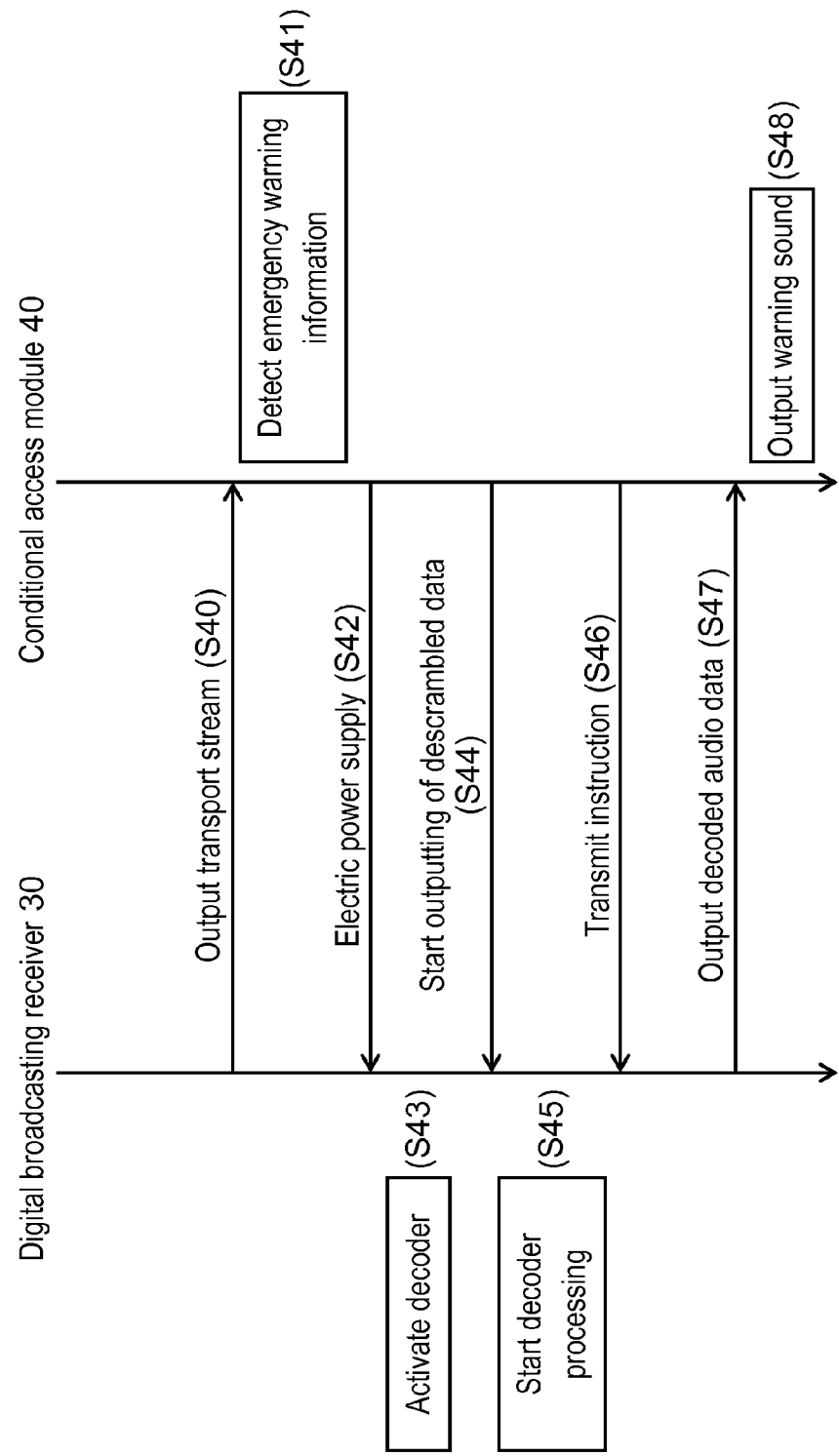

MODULE COPING WITH CONDITIONAL ACCESS BROADCASTING, DIGITAL BROADCASTING RECEIVING SYSTEM, AND METHOD OF CONTROLLING MODULE COPING WITH CONDITIONAL ACCESS BROADCASTING

BACKGROUND OF THE INVENTION

1. Field of the Invention

This disclosure relates to a module coping with conditional access broadcasting, a digital broadcasting receiving system, and a method of controlling a module coping with conditional access broadcasting.

2. Description of the Related Art

Unexamined Japanese Patent Publication No. 2005-079753 discloses a set-top box. This set-top box includes a warning device such as a buzzer or an alarm and a display device such as a liquid crystal display or an electric sign. This set-top box operates the warning device when detecting emergency warning broadcasting, and displays a message in form of letters to explain a situation in which the emergency warning broadcasting is detected on the display device.

SUMMARY OF THE INVENTION

A module coping with conditional access broadcasting in the disclosure includes an interface detachable from a receiver, which can receive digital broadcasting including conditional access broadcasting, for acquiring a transport stream produced based on the digital broadcasting, a descrambler that descrambles data included in the transport stream, a loudspeaker that outputs sound, and a controller that detects emergency warning information included in the transport stream and controls the loudspeaker to output sound related to the emergency warning information in response to the detection of the emergency warning information.

The digital broadcasting receiving system in the disclosure is a digital broadcasting receiving system including a receiver capable of receiving digital broadcasting including conditional access broadcasting but excluding a loudspeaker which outputs sound, and a module detachable from the receiver and coping with conditional access broadcasting, and the receiver includes a tuner that receives digital broadcasting to produce a transport stream based on the received digital broadcasting, and the module coping with conditional access broadcasting includes an interface detachable from the receiver for acquiring the transport stream from the receiver, a descrambler that descrambles data included in the transport stream, a loudspeaker that outputs sound, and a controller that detects emergency warning information included in the transport stream and controls the loudspeaker to output sound related to the emergency warning information in response to the detection of the emergency warning information.

A method of controlling a module coping with conditional access broadcasting in the disclosure is a method of controlling a module coping with conditional access broadcasting and detachable from a receiver that can receive digital broadcasting including conditional access broadcasting, acquiring a transport stream produced based on the digital broadcasting, descrambling data included in the transport stream, and detecting emergency warning information included in the transport stream and outputting sound related to emergency warning information in response to the detection of the emergency warning information.

BRIEF DESCRIPTION OF THE DRAWINGS

FIG. 7 is a timing chart for explaining an operation of the digital broadcasting receiving system according to the second embodiment.

DETAILED DESCRIPTION OF THE PREFERRED EMBODIMENTS

Embodiments will be described below with reference to the accompanying drawings. An excessively detailed description may not be made. For example, a detailed explanation of generally-known facts and an overlapping explanation of substantially the same configuration may not be made. This is to avoid the following explanation from being unnecessarily redundant and to make the persons skilled in the art easy to understand the explanation.

The present inventor(s) provides the accompanying drawings and the following explanation to allow the persons skilled in the art to sufficiently understand the disclosure, and does not intend to limit the concept described in the scope of claims by the accompanying drawings and the following explanation.

(First Embodiment)

A first embodiment will be described below with reference to the accompanying drawings.

[1-1. Outline]

Figure 1:
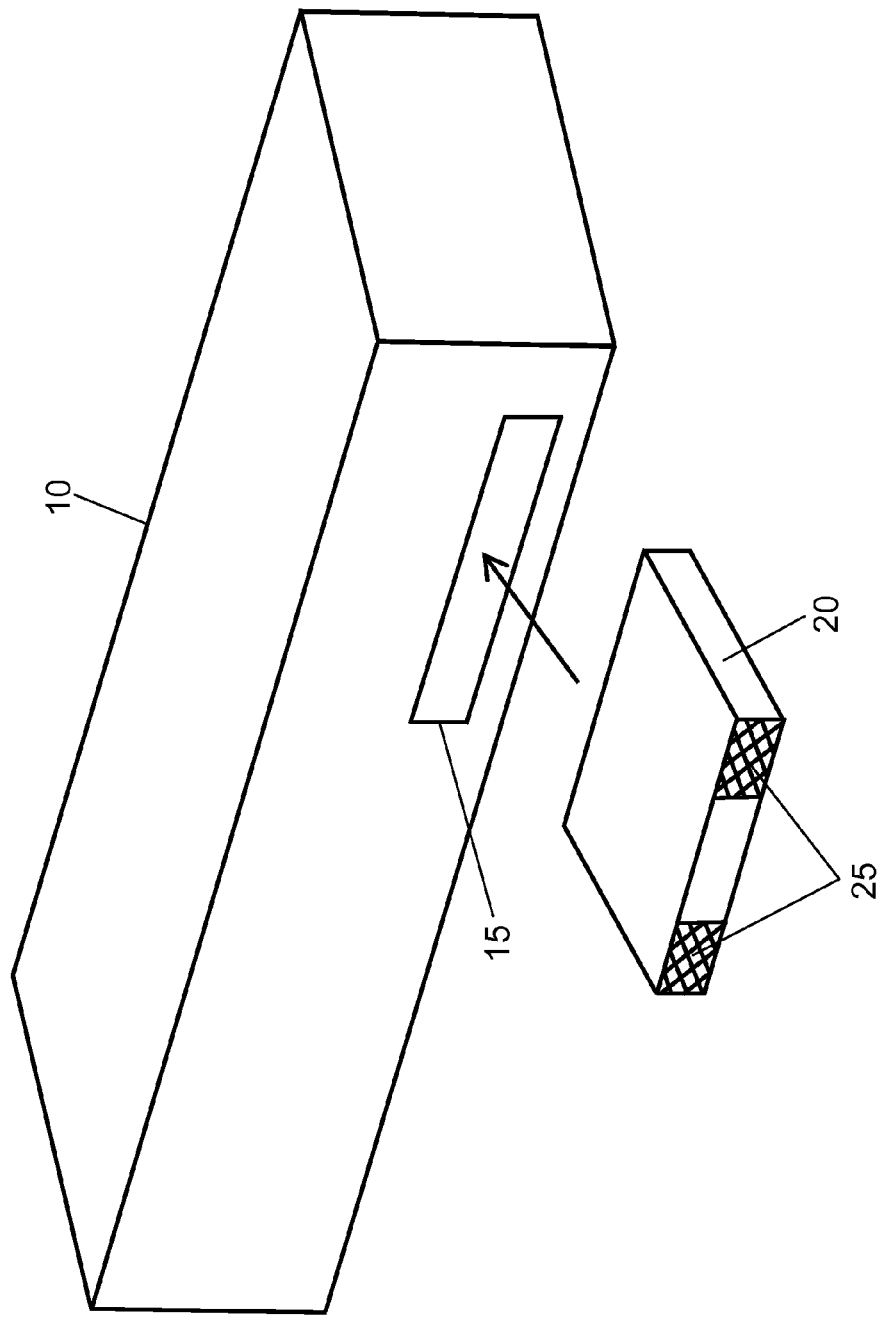
FIG. 1 is a schematic diagram showing an appearance of a digital broadcasting receiving system according to a first embodiment seen from obliquely above.
Figure 2:
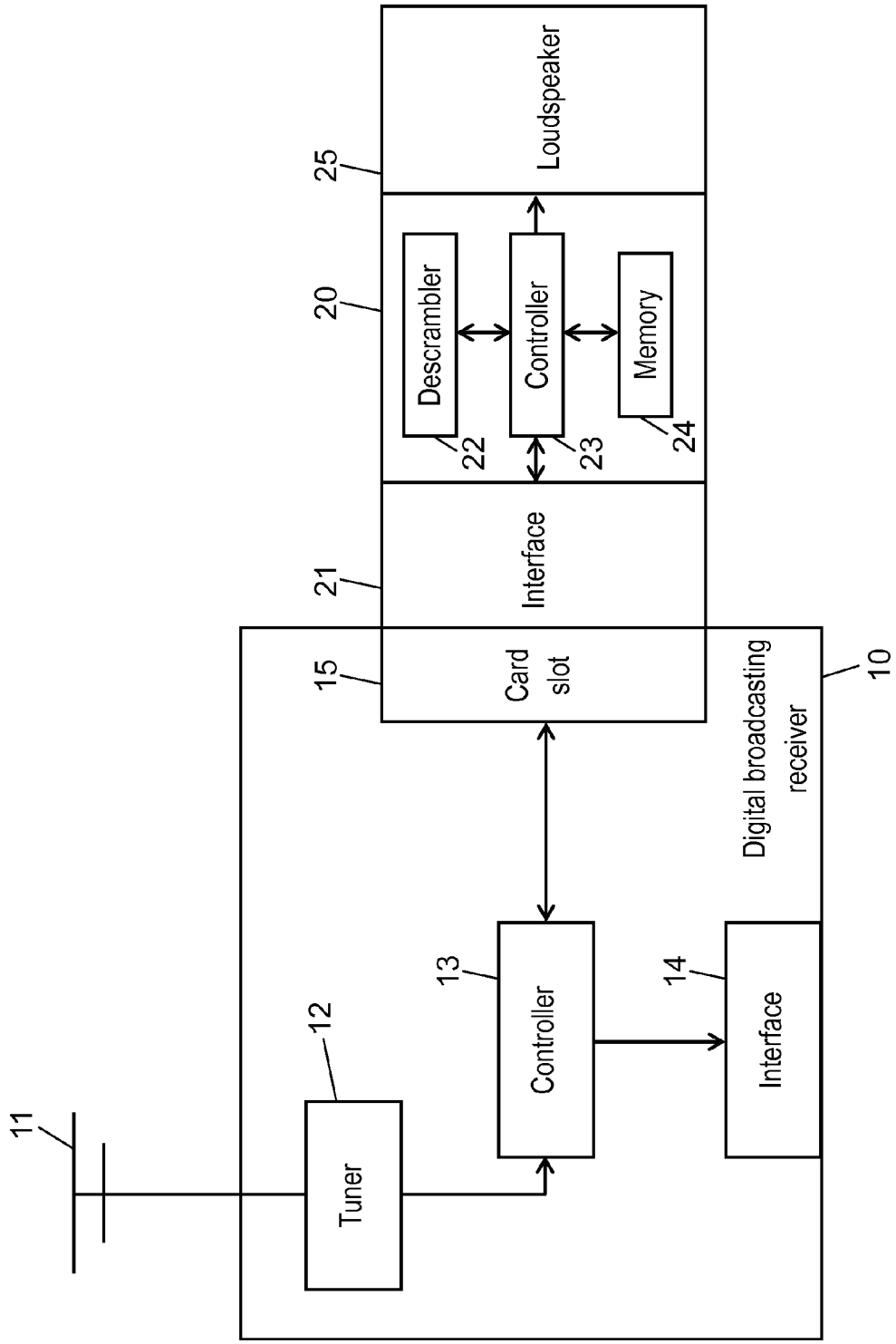
FIG. 2 is a block diagram showing an electric configuration of the digital broadcasting receiving system according to the first embodiment.

An outline of a digital broadcasting receiving system according to the present embodiment will be described below with reference to FIGS. 1 and 2. FIG. 1 is a schematic diagram showing an appearance of the digital broadcasting receiving system seen from obliquely above. FIG. 2 is a block diagram showing an electric configuration of the digital broadcasting receiving system.

The digital broadcasting receiving system according to the present embodiment includes digital broadcasting receiver 10 and conditional access broadcasting module 20. Conditional access broadcasting module 20 is detachable from card slot 15 arranged on the front surface of digital broadcasting receiver 10. Conditional access broadcasting module 20 is a kind of, for example, a cable card or a CAM (Conditional Access Module). Digital broadcasting receiver 10 receives digital broadcasting. Digital broadcasting receiver 10 produces a transport stream based on the received digital broadcasting. Digital broadcasting receiver 10 causes conditional access broadcasting module 20 to execute descrambling processing to data included in the produced transport stream. Digital broadcasting receiver 10 performs various processing to the descrambled data and outputs the data subjected to the various processing to a television device or the like connected to digital broadcasting receiver 10. For example, digital broadcasting receiver 10 is an STB (Set Top Box). Note that, when a surface that is firstly taken into digital broadcasting receiver 10 when conditional access broadcasting module 20 is attached to digital broadcasting receiver 10 is defined as a front surface, conditional access broadcasting module 20 includes loudspeaker 25 on a rear surface facing the front surface.

Some standards of digital broadcasting in various countries define emergency warning information. The emergency warning information mentioned herein is information representing a fact that an earthquake occurs, the magnitude of the earthquake, a location where the earthquake occurs, and the like. The emergency warning information is transmitted being included in a broadcasting wave when, for example, a huge earthquake occurs.

For example, in the standards of cable television broadcasting in the U.S., a standard called Emergency Alert Message For Cable is set. Program specific information (PSI)/Service information (SI) defined by the standard includes a table called an Emergency Alert Message Format. Various values of the table are set to produce emergency warning information representing contents of an emergency warning.

When the emergency warning information is detected, digital broadcasting receiver 10 should notify a user of occurrence of an emergency situation by some means. However, digital broadcasting receiver 10 does not include a loudspeaker. Thus, digital broadcasting receiver 10 is not able to generate some sound by itself to notify a user that an emergency situation occurs.

Hence, conditional access broadcasting module 20 includes interface 21, descrambler 22, loudspeaker 25, and controller 23. Interface 21 is detachable from digital broadcasting receiver 10 that can receive digital broadcasting including conditional access broadcasting. Interface 21 acquires a transport stream produced based on digital broadcasting. Descrambler 22 descrambles data included in the transport stream. Loudspeaker 25 outputs sound. Controller 23 detects emergency warning information included in the transport stream and controls loudspeaker 25 to output sound related to the emergency warning information in response to the detection of the emergency warning information.

In this manner, even when conditional access broadcasting module 20 is attached to digital broadcasting receiver 10 having no loudspeaker, when conditional access broadcasting module 20 detects emergency warning information, a user can be informed that the emergency warning information is transmitted.

[1-2. Electric Configuration of Digital Broadcasting Receiving System]

An electric configuration of a digital broadcasting receiving system according to the present embodiment will be described below with reference to FIG. 2.

As described above, the digital broadcasting receiving system according to the present embodiment includes digital broadcasting receiver 10 and conditional access broadcasting module 20. Digital broadcasting receiver 10 includes antenna 11, tuner 12, controller 13, interface 14, and card slot 15. Antenna 11 receives digital broadcasting. Tuner 12 extracts digital broadcasting of a channel selected by a user from digital broadcasting received through antenna 11. Tuner 12 performs demodulation, error correction, and the like to data represented by the extracted digital broadcasting to produce a transport stream.

Controller 13 is a control unit that controls the whole of digital broadcasting receiver 10. Controller 13 outputs the transport stream received from tuner 12 to conditional access broadcasting module 20 through card slot 15. Controller 13 performs various processing to the descrambled transport stream acquired from conditional access broadcasting module 20. For example, controller 13 performs demultiplexing processing and decoding processing such as video decoding processing, and audio decoding processing to the descrambled transport stream. Controller 13 outputs the decoded data to an external device through interface 14.

Digital broadcasting receiver 10 is connected to the external device such as a television device through interface 14. For example, interface 14 is configured by an HDMI (High Definition Multimedia Interface) connection terminal. Conditional access broadcasting module 20 is attached to digital broadcasting receiver 10 through card slot 15.

Conditional access broadcasting module 20 includes interface 21, descrambler 22, controller 23, memory 24, and loudspeaker 25. Interface 21 is electrically and mechanically connected to card slot 15. Descrambler 22 performs descrambling processing to an encrypted transport stream acquired from digital broadcasting receiver 10. Controller 23 is a control unit that controls the whole of conditional access broadcasting module 20. Memory 24 stores audio data therein. The audio data is data to notify a user that emergency warning information is received. For example, the audio data is audio data representing a warning sound such as "An earthquake has occured. Please flee to a safe place.". For example, memory 24 is configured by a flash memory. Loudspeaker 25 outputs the sound represented by the audio data stored in memory 24.

[1-3. Operation of Conditional Access Broadcasting Module]

Figure 3:
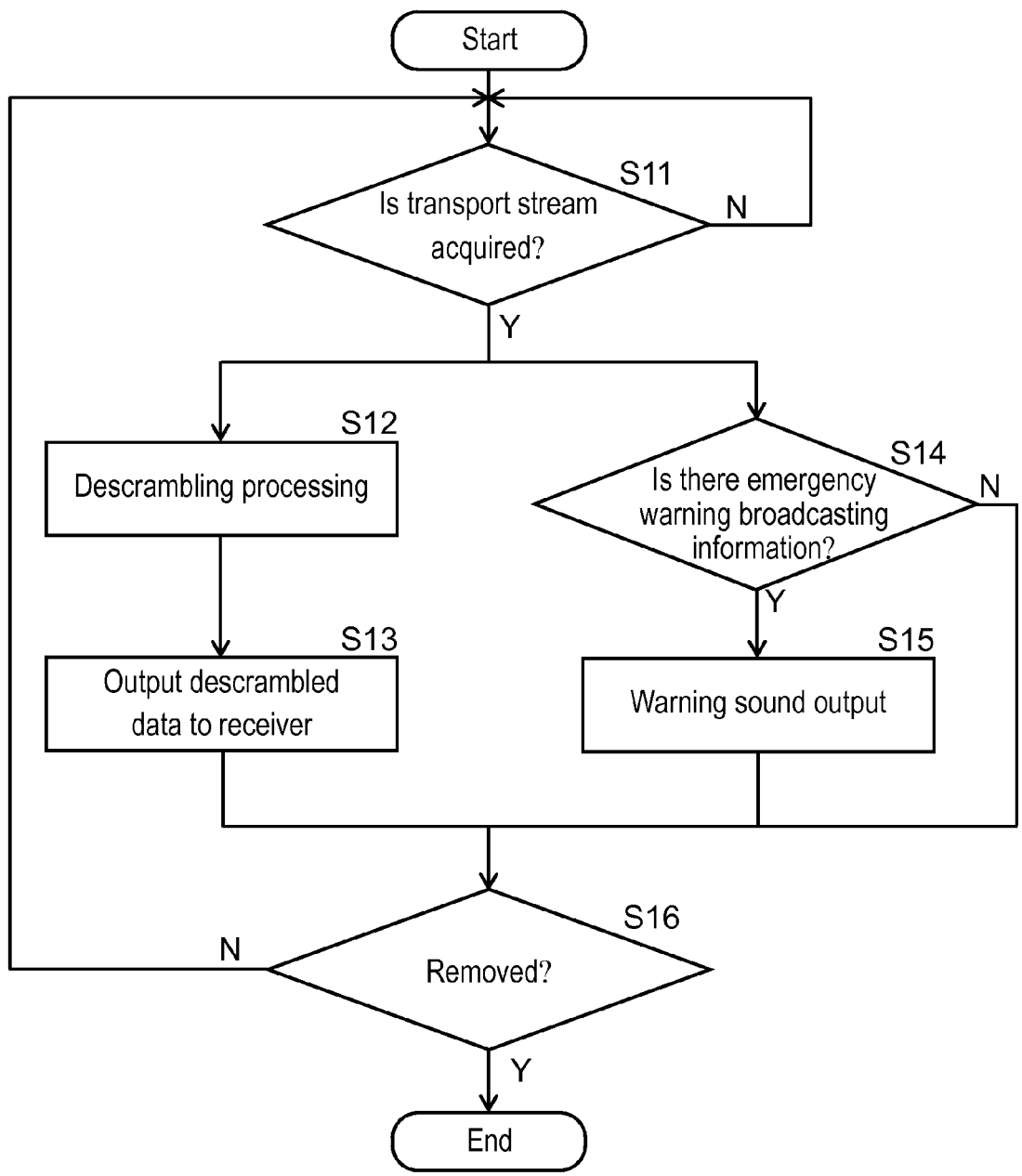
FIG. 3 is a flow chart for explaining an operation of a conditional access module according to the first embodiment.

An operation of conditional access broadcasting module 20 will be described below with reference to FIG. 3. FIG. 3 is a flow chart for explaining an operation of conditional access broadcasting module 20.

In response to attachment of conditional access broadcasting module 20 to digital broadcasting receiver 10, the operation of conditional access broadcasting module 20 is started. When conditional access broadcasting module 20 is attached to digital broadcasting receiver 10, controller 23 waits until controller 23 acquires a transport stream from digital broadcasting receiver 10 through interface 21 (S11).

When controller 23 acquires the transport stream, controller 23 paratactically executes two processing. As first processing, controller 23 controls descrambler 22 to execute descrambling processing to the acquired transport stream (S12). Upon completion of the descrambling processing, controller 23 outputs the descrambled data to digital broadcasting receiver 10 (S13).

When the transport stream is acquired in step S11, as second processing, controller 23 determines whether the acquired transport stream includes emergency warning information (S14). When it is determined that the transport stream includes the emergency warning information, controller 23 reads out audio data from memory 24, decodes the read-out audio data, and controls loudspeaker 25 to output warning sound that is sound represented by the decoded audio data (S15).

When the descrambled data is output to digital broadcasting receiver 10 in step S13, when it is determined in step S14 that the transport stream does not include the emergency warning information, or when the warning sound is output from loudspeaker 25 in step S15, controller 23 determines whether conditional access broadcasting module 20 is removed from digital broadcasting receiver 10 (S16). When it is determined that conditional access broadcasting module 20 is removed, controller 23 ends the control of conditional access broadcasting module 20. On the other hand, when it is determined that conditional access broadcasting module 20 is not removed, controller 23 repeats the processing started from step S11.

[1-4. Effects or the Like]

In this manner, conditional access broadcasting module 20 according to the present embodiment includes interface 21, descrambler 22, loudspeaker 25, and controller 23. Interface 21 is detachable from digital broadcasting receiver 10 that can receive digital broadcasting including conditional access broadcasting, and acquires a transport stream produced based on the digital broadcasting. Descrambler 22 descrambles data included in the transport stream. Loudspeaker 25 outputs sound. Controller 23 detects emergency warning information included in the transport stream and controls loudspeaker 25 to output sound related to the emergency warning information in response to the detection of the emergency warning information.

In this manner, even when conditional access broadcasting module 20 is attached to digital broadcasting receiver 10 having no loudspeaker, when conditional access broadcasting module 20 detects emergency warning information, a user can be informed that the emergency warning information is transmitted.

Conditional access broadcasting module 20 according to the present embodiment further includes memory 24. Controller 23 included in conditional access broadcasting module 20 controls loudspeaker 25 to output sound represented by audio data stored in memory 24 in response to the detection of emergency warning information.

In this manner, when conditional access broadcasting module 20 detects emergency warning information, the conditional access broadcasting module 20 can immediately notify a user that an emergency situation occurs without especially acquiring external audio data.

(Second Embodiment)

A second embodiment will be described below with reference to the accompanying drawings. In the present embodiment, portions different from those in the first embodiment will be mainly described. The same reference numerals as in the first embodiment denote the same configurations also in the drawings.

[2-1. Outline]

Figure 4:
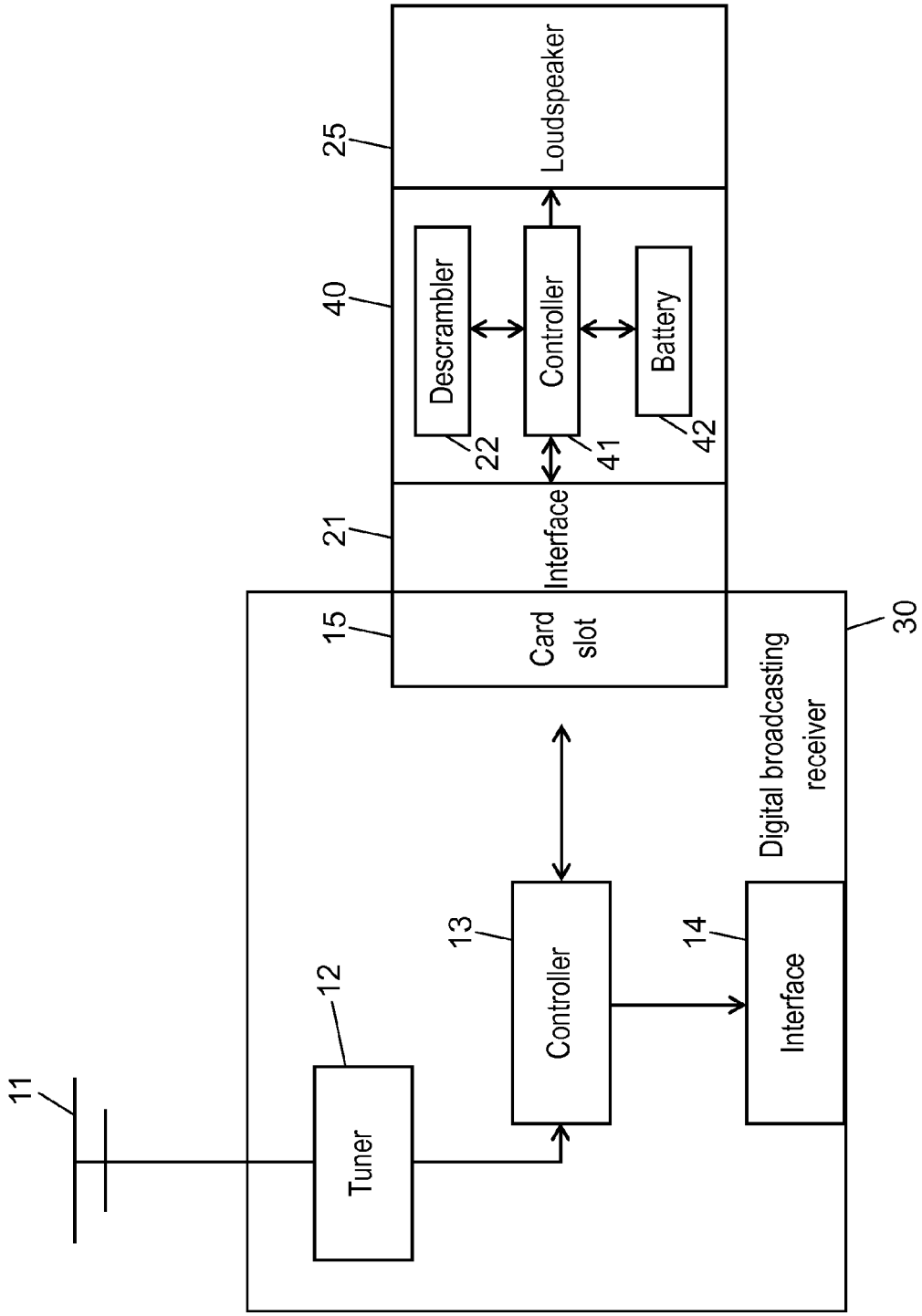
FIG. 4 is a block diagram showing an electric configuration of a digital broadcasting receiving system according to a second embodiment.

An outline of a digital broadcasting receiving system according to the present embodiment will be described with reference to FIG. 4. FIG. 4 is a block diagram showing an electric configuration of the digital broadcasting receiving system according to the present embodiment.

The digital broadcasting receiving system according to the present embodiment includes digital broadcasting receiver 30 and conditional access broadcasting module 40. Main different points between the first embodiment and the present embodiment are that conditional access broadcasting module 40 has battery 42 and that conditional access broadcasting module 40 does not have memory 24 of the first embodiment.

[2-2. Electric Configuration]

An electric configuration of a digital broadcasting receiving system according to the present embodiment will be described below with reference to FIG. 4.

As described above, the digital broadcasting receiving system according to the present embodiment includes digital broadcasting receiver 30 and conditional access broadcasting module 40. Digital broadcasting receiver 30 includes antenna 11, tuner 12, interface 14, card slot 15, and controller 31. Digital broadcasting receiver 30 is mainly different from digital broadcasting receiver 10 according to the first embodiment in the contents of control by controller 31.

Conditional access broadcasting module 40 includes interface 21, descrambler 22, loudspeaker 25, controller 41, and battery 42. Conditional access broadcasting module 40 is different from conditional access broadcasting module 20 of the first embodiment in the contents of control by controller 41. As described above, conditional access broadcasting module 40 is different from conditional access broadcasting module 20 of the first embodiment in that conditional access broadcasting module 40 includes battery 42. Battery 42 is an accumulator that accumulates electric charge.

For example, battery 42 is configured by a lithium ion battery.

[2-3. Operation]

[2-3-1. Operation of Conditional Access Broadcasting Module]

Figure 5:
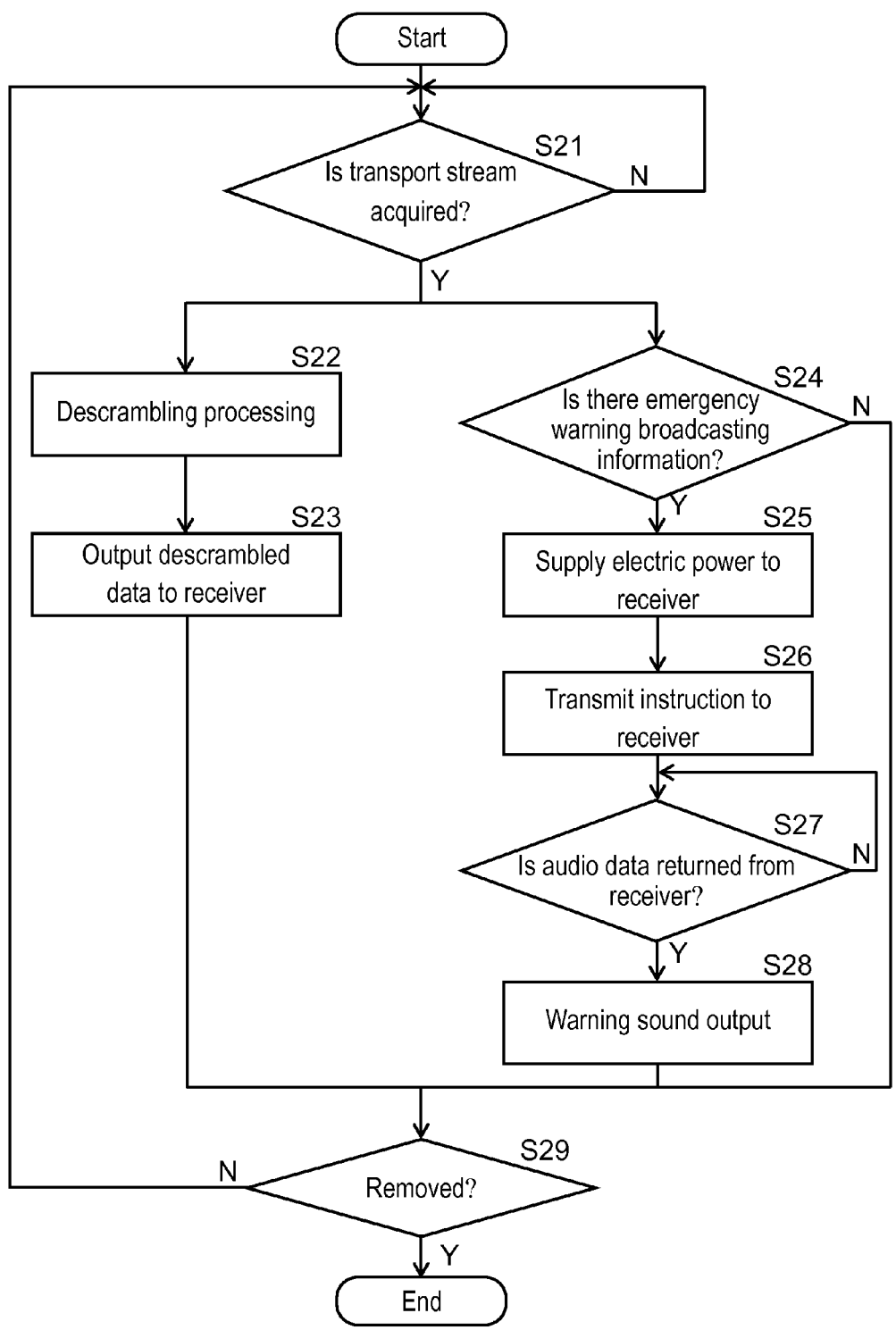
FIG. 5 is a flow chart for explaining an operation of a conditional access module according to the second embodiment.

An operation of conditional access broadcasting module 40 will be described below with reference to FIG. 5. FIG. 5 is a flow chart for explaining an operation of conditional access broadcasting module 40.

In response to attachment of conditional access broadcasting module 40 to digital broadcasting receiver 30, the operation of conditional access broadcasting module 40 is started. When conditional access broadcasting module 40 is attached to digital broadcasting receiver 30, controller 41 waits until controller 41 acquires a transport stream from digital broadcasting receiver 30 through interface 21 (S21).

When controller 41 acquires the transport stream, controller 41 paratactically executes two processing. First processing (S22, S23) herein is the same as the first processing (S12, S13) in FIG. 3 in the first embodiment.

When the transport stream is acquired, as second processing, controller 41 determines whether the acquired transport stream includes emergency warning information (S24). When it is determined that the transport stream includes emergency warning information, controller 41 supplies an electric power accumulated in battery 42 to controller 31 (S25). When the electric power supply to controller 31 is started, controller 41 transmits an instruction to digital broadcasting receiver 30 to output audio data corresponding to the emergency warning information (S26). When the instruction is transmitted, controller 41 waits until audio data is output from digital broadcasting receiver 30 (S27). When controller 41 acquires the audio data from digital broadcasting receiver 30, controller 41 controls loudspeaker 25 to output warning sound represented by the acquired audio data (S28).

Control in step S29 is the same as the processing in step S16 in FIG. 3 in the first embodiment.

[2-3-2. Operation of Digital Broadcasting Receiver]

Figure 6:
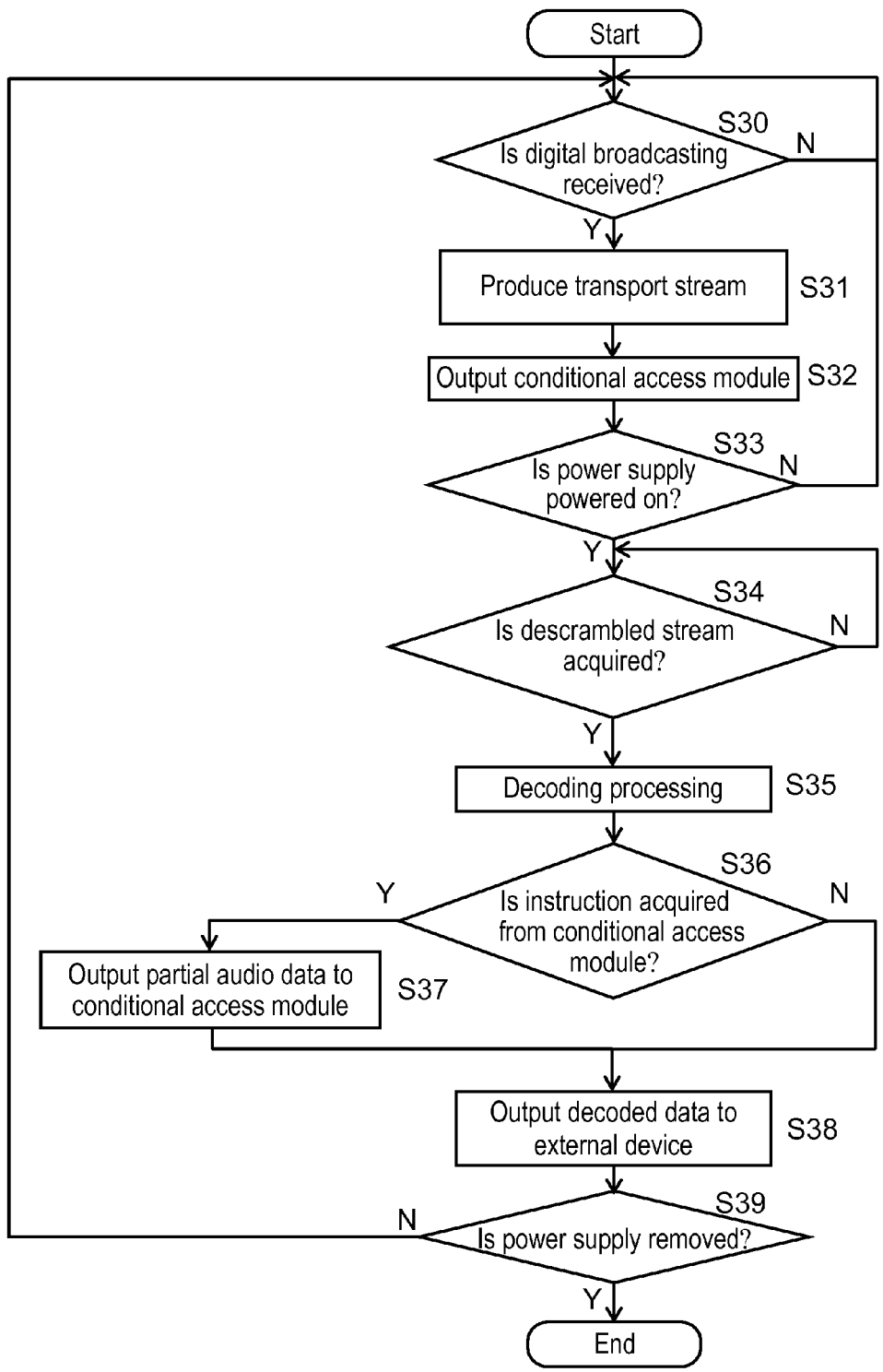
FIG. 6 is a flow chart for explaining an operation of a digital broadcasting receiver according to the second embodiment.

An operation of digital broadcasting receiver 30 will be described with reference to FIG. 6. FIG. 6 is a flow chart for explaining an operation of digital broadcasting receiver 30.

When a plug (not shown) provided to digital broadcasting receiver 30 is connected to a home power supply, an operation of digital broadcasting receiver 30 is started. When the operation of digital broadcasting receiver 30 is started, controller 31 waits until controller 31 receives digital broadcasting through antenna 11 (S30). When controller 31 receives digital broadcasting, controller 31 controls tuner 12 to produce a transport stream based on the received digital broadcasting (S31). When tuner 12 produces a transport stream, controller 31 outputs the produced transport stream to conditional access broadcasting module 40 (S32).

When the transport stream is output to conditional access broadcasting module 40, controller 31 determines that an internal decoder is activated with the power supply of digital broadcasting receiver 30 in a power-on state (S33). When digital broadcasting receiver 30 is directly powered on by a user, or when the internal decoder is activated by obtaining an electric power from battery 42 of conditional access broadcasting module 40, controller 31 determines that the internal decoder is activated.

When it is determined that the internal decoder is activated, controller 31 waits until controller 31 acquires a descrambled transport stream that is encoded from conditional access broadcasting module 40 (S34). When controller 31 acquires the descrambled transport stream that is encoded, controller 31 executes decoding processing to the acquired transport stream (S35).

When controller 31 executes the decoding processing, controller 31 determines whether an instruction to request conditional access broadcasting module 40 to output audio data corresponding to emergency warning information is acquired (S36). When controller 31 determines that the instruction is acquired, controller 31 detects audio data corresponding to emergency warning information from the audio data to which the decoding processing is executed, and outputs the detected audio data to conditional access broadcasting module 40 (S37).

When the detected audio data is output to conditional access broadcasting module 40 in step S37 or when it is determined that the instruction is not acquired from conditional access broadcasting module 40 in step S36, controller 31 outputs the decoded data to which the decoding processing is executed in step S35 to an external device through interface 14 (S38).

When the decoded data is output to the external device, controller 31 determines whether a plug is disconnected (S39). When it is determined that the plug is not disconnected, the processing started from step S30 is repeated.

[2-3-3. Operation Performed Upon Detection of Emergency Warning Information]

An operation performed when the digital broadcasting receiving system according to the present embodiment receives digital broadcasting including emergency warning information will be described with reference to FIG. 7. FIG. 7 is a timing chart for explaining an operation of the digital broadcasting receiving system according to the present embodiment.

First, digital broadcasting receiver 30 outputs a transport stream to conditional access broadcasting module 40 (S40). It is assumed that conditional access broadcasting module 40 detects that the acquired transport stream includes emergency warning information (S41). In this case, conditional access broadcasting module 40 starts electric power supply to digital broadcasting receiver 30 (S42). When digital broadcasting receiver 30 receives an electric power, digital broadcasting receiver 30 activates a portion corresponding to a decoder of internal controller 31 (S43). After conditional access broadcasting module 40 starts power supply to digital broadcasting receiver 30, conditional access broadcasting module 40 begins to output a descrambled transport stream that is encoded to digital broadcasting receiver 30 (S44). When digital broadcasting receiver 30 acquires the descrambled transport stream that is encoded, digital broadcasting receiver 30 starts decoding processing to the acquired transport stream (S45). When conditional access broadcasting module 40 begins to output the descrambled transport stream to digital broadcasting receiver 30, conditional access broadcasting module 40 transmits an instruction to output the decoded audio data to digital broadcasting receiver 30 (S46). When the digital broadcasting receiver 30 acquires the instruction, digital broadcasting receiver 30 outputs the audio data corresponding to the emergency warning information from the decoded audio data to conditional access broadcasting module 40 (S47). When conditional access broadcasting module 40 receives the decoded audio data, conditional access broadcasting module 40 outputs warning sound represented by the acquired audio data through loudspeaker 25 (S48).

[2-4. Effects or the Like]

In this manner, a conditional access broadcasting module 40 according to the present embodiment includes interface 21, descrambler 22, loudspeaker 25, and controller 41. Interface 21 is detachable from digital broadcasting receiver 30 that can receive digital broadcasting including conditional access broadcasting, and acquires a transport stream produced based on the digital broadcasting. Descrambler 22 descrambles data included in the transport stream. Loudspeaker 25 outputs sound. Controller 41 detects emergency warning information included in the transport stream and controls loudspeaker 25 to output sound related to the emergency warning information in response to the detection of the emergency warning information. Controller 41 transmits an instruction to digital broadcasting receiver 30 in response to the detection of the emergency warning information. Interface 21 acquires audio data transmitted in response to acquisition of the instruction by digital broadcasting receiver 30. Controller 41 controls loudspeaker 25 to output sound represented by the audio data acquired by interface 21.

In this manner, even when conditional access broadcasting module 40 stores the audio data corresponding to the emergency warning information in advance, conditional access broadcasting module 40 can acquire appropriate audio data from the digital broadcasting in each case. For example, when the audio data corresponding to the emergency warning information included in the digital broadcasting includes pieces of information of an area of occurrence of an earthquake, time of the occurrence, a scale of the earthquake, and the like, conditional access broadcasting module 40 can output the audio data including the pieces of information when the emergency warning information is detected.

Conditional access broadcasting module 40 according to the present embodiment further includes battery 42. Controller 23 controls battery 42 to supply an electric power to digital broadcasting receiver 30 in response to the detection of the emergency warning information.

In this manner, even when a decoder potion of controller 31 included in the digital broadcasting receiver 30 is not activated when the emergency warning information is detected, conditional access broadcasting module 40 can activate the decoder potion of controller 31 to execute decoding processing or the like to the audio data.

The digital broadcasting receiving system according to the present embodiment includes digital broadcasting receiver 30 that can receive digital broadcasting including conditional access broadcasting and does not include a loudspeaker to output sound, and conditional access broadcasting module 40 detachable from digital broadcasting receiver 30 and coping with conditional access broadcasting. Digital broadcasting receiver 30 includes tuner 12. Tuner 12 receives digital broadcasting and produces a transport stream based on the received digital broadcasting. Conditional access broadcasting module 40 coping with conditional access broadcasting includes interface 21, descrambler 22, loudspeaker 25, and controller 41. Interface 21 is detachable from digital broadcasting receiver 30 and acquires a transport stream from digital broadcasting receiver 30. Descrambler 22 descrambles data included in the transport stream. Loudspeaker 25 outputs sound. Controller 41 detects emergency warning information included in the transport stream and controls loudspeaker 25 to output sound related to the emergency warning information in response to the detection of the emergency warning information.

In this manner, even when digital broadcasting receiver 30 itself does not include a loudspeaker, when emergency warning information is detected, the digital broadcasting receiving system according to the present embodiment can notify a user that the emergency warning information is transmitted.

In the digital broadcasting receiving system according to the present embodiment, controller 41 transmits an instruction to digital broadcasting receiver 30 in response to the detection of the emergency warning information. Digital broadcasting receiver 30 further includes controller 31. The decoder portion of controller 31 acquires data that is descrambled by descrambler 22 and encoded from conditional access broadcasting module 40 and performs decoding processing to the acquired encoded data. Controller 31, in response to acquisition of an instruction, outputs partial audio data from the data to which decoding processing is performed by the decoder portion of controller 31 to conditional access broadcasting module 40.

In response to acquisition of audio data from card slot 15, controller 41 controls loudspeaker 25 to output sound represented by the acquired audio data.

In this manner, the digital broadcasting receiving system according to the present embodiment can acquire appropriate audio data from the digital broadcasting in each case.

As described above, as an illustration of the technique in the disclosure, the first and second embodiments are described. For this purpose, the accompanying drawings and the detailed description are provided.

Thus, the constituent elements described in the accompanying drawings and the detailed description can include not only constituent elements that are required to solve the problems but also constituent elements that are not required to solve the problems to illustrate the above technique. Accordingly, even when the unessential constituent elements are described in the accompanying drawings and the detailed description, it not should be immediately concluded that the unessential constituent elements are necessary.

Since the above embodiments illustrate the technique in the disclosure, various changes, replacements, additions, and omissions can be executed in the scope of claims or a scope equivalent thereto.

What is claimed is:

1. A module configure to cope with conditional access broadcasting comprising:
   an interface that is detachable from a receiver, the receiver being configured to receive digital broadcasting including conditional access broadcasting, and the interface being configured to acquire a transport stream produced based on the digital broadcasting;
   a descrambler configured to descramble data included in the transport stream;
   a loudspeaker configured to output sound;
   a controller configured to detect emergency warning information included in the transport stream and control the loudspeaker to output sound so as to communicate a location of an emergency in response to the detection of the emergency warning information; and
   a battery,
   wherein the controller is configured to control the battery to supply an electric power to the receiver in response to the detection of the emergency warning information.

2. The module configured to cope with conditional access broadcasting according to claim 1, further comprising a memory configured to store audio data,
   wherein the controller is configured to control the loudspeaker to output sound represented by the audio data stored in the memory in response to the detection of the emergency warning information.

3. The module configured to cope with conditional access broadcasting according to claim 1,
   wherein the controller is configured to transmit an instruction to the receiver in response to the detection of the emergency warning information,
   wherein the interface is configured to acquire audio data transmitted in response to acquisition of the instruction by the receiver, and
   wherein the controller is configured to control the loudspeaker to output sound represented by the audio data acquired by the interface.

4. A digital broadcasting receiving system comprising a receiver configured to receive digital broadcasting including conditional access broadcasting but excluding a loudspeaker configured to output sound, and a module that is detachable from the receiver and configured to cope with conditional access broadcasting,
   wherein the receiver includes:
   a tuner configured to receive the digital broadcasting and produce a transport stream based on the received digital broadcasting, and
   wherein the module configured to cope with conditional access broadcasting includes:
   an interface that is detachable from the receiver and configured to acquire the transport stream from the receiver;
   a descrambler configured to descramble data included in the transport stream;
   a loudspeaker configured to output sound;
   a first controller configured to detect emergency warning information included in the transport stream and control the loudspeaker to output sound so as to communicate a location of an emergency in response to the detection of the emergency warning information; and
   a battery,
   wherein the first controller is configured to control the battery to supply an electric power to the receiver in response to the detection of the emergency warning information.

5. The digital broadcasting receiving system according to claim 4,
   wherein the first controller is configured to transmit an instruction to the receiver in response to the detection of the emergency warning information,
   wherein the receiver further includes:
   a decoder configured to acquire data descrambled by the descrambler and encoded from the module and perform decoding processing to the acquired encoded data; and
   a second controller that, in response to acquisition of the instruction, is configured to output partial audio data from data, to which the decoding processing is performed by the decoder, to the module, and
   wherein the first controller, in response to acquisition of the audio data from the second controller, is configured to control the loudspeaker to output sound represented by the acquired audio data.

6. A method of controlling a module that copes with conditional access broadcasting and is detachable from a receiver configured to receive digital broadcasting including conditional access broadcasting, the method comprising:
   acquiring a transport stream produced based on the digital broadcasting;
   descrambling data included in the transport stream;

detecting emergency warning information included in the transport stream;

outputting sound so as to communicate a location of an emergency in response to the detection of the emergency warning information; and controlling a battery to supply an electric power to the receiver in response to the detection of the emergency warning information.

7. The module configured to cope with conditional access broadcasting according to claim 1, wherein the loudspeaker is positioned on a rear surface of the module such that the loudspeaker is exposed in a state in which the module is attached to the receiver.

8. The digital broadcasting receiving system according to claim 4, wherein the loudspeaker is positioned on a rear surface of the module such that the loudspeaker is exposed in a state in which the module is attached to the receiver.

9. The method of controlling a module that copes with conditional access broadcasting according to claim 6, wherein the sound is outputted on a loudspeaker positioned on a rear surface of the module such that the loudspeaker is exposed in a state in which the module is attached to the receiver.

10. A module configured to cope with conditional access broadcasting comprising:

an interface that is detachable from a receiver, the receiver being configured to receive digital broadcasting including conditional access broadcasting, and the interface being configured to acquire a transport stream produced based on the digital broadcasting;

a descrambler configured to descramble data included in the transport stream;

a controller configured to detect emergency warning information included in the transport stream; and a battery, wherein the controller is configured to transmit an instruction to the receiver in response to the detection of the emergency warning information to output an audio data representing a sound so as to communicate a location of an emergency, and wherein the controller is configured to control the battery to supply an electric power to the receiver in response to the detection of the emergency warning information.

11. The module configured to cope with conditional access broadcasting according to claim 10, wherein the controller is configured to transmit the instruction to the receiver in response to the detection of the emergency warning information to output the audio data representing the sound so as to communicate the location of the emergency to an external device.

* * * * *